FIG. 1.

INVENTOR
Fenton M. Wood

INVENTOR
Fenton M. Wood

United States Patent Office 3,345,563
Patented Oct. 3, 1967

3,345,563
METHOD AND APPARATUS FOR MEASURING TRUE DISCONTINUITIES IN MEMBERS OF VARYING THICKNESS BY COMPENSATING FOR THE EFFECT OF THICKNESS ON SUCH MEASUREMENTS
Fenton M. Wood, Sugarland, Tex., assignor, by mesne assignments, to American Machine & Foundry Company, New York, N.Y., a corporation of New Jersey
Filed July 1, 1963, Ser. No. 292,028
19 Claims. (Cl. 324—37)

This invention relates to discontinuity evaluation systems and more specifically to methods and apparatus for accurately evaluating the magnitude of discontinuities in various members which may be inspected.

On purchasing a manufactured product, it is common practice to specify the type of flaws or other types of discontinuities, which can be tolerated and the extent to which they can be tolerated. It has long been recognized that discontinuities which effectively reduce the cross-sectional area in a member of magnetic material can be detected by various nondestructive magnetic testing techniques. This is usually acomplished by inducing magnetic flux in the member being inspected so that the lines of flux are perpendicular to the anticipated discontinuity. A discontinuity, if present, tends to distort the magnetic field in the vicinity of the flaw because of the reduction in cross-sectional area of the member. In other words, the reduction in cross-sectional area cause the lines of flux to bulge, creating increased leakage flux on the surface of the member in the vicinity of the discontinuity. The increase in leakage flux is proportional to the reduction in cross-sectional area and hence, indicates the magnitude of the discontinuity. The increased leakage flux can then be measured by a magnetic pickup coil, or a flux responsive device, on the surface of the member. If the member being inspected has a known, and fairly uniform thickness, measurement of leakage flux provides a meaningful indication of the discontinuity magnitude. The inspection apparatus can easily be calibrated by first inspecting specimens of the same material and thickness having known flaw magnitudes. However, when the member to be inspected has unknown thickness, or nonuniform thickness, it becomes much more difficult to correlate the test results, since the thickness variations affect the induced flux density in the member and the leakage flux magnitude.

Thus it is an object of this invention to provide an improved method for accurately evaluating the magnitude of discontinuities in members of nonuniform or unknown thickness.

It is another object of the invention to provide an improved apparatus for measuring the magnitude of discontinuities in metallic members of nonuniform or unpredictable thickness.

It is another object to provide an improved apparatus adapted to measure the magnitude of radially extending flaws in tubular members.

It is still another object to provide an improved apparatus which is responsive to leakage flux caused by discontinuities in a member being inspected, and which is operable to compensate for the effect of thickness variations in the leakage flux measurement to thereby achieve an accurate indication of discontinuity magnitudes.

In accordance with the method of this invention, magnetic flux is induced in the member so that the magnetic lines of force are perpendicular to the anticipated discontinuity or flaw within the member being inspected. For example, the member may be inspected for cracks having depth as well as width, and, under these circumstances, the lines of force should be perpendicular to the area defined by the depth and width of such a flaw. The leakage flux at the surface of the member, as caused by the flaw, is measured to derive a first signal having a magnitude related to the flaw magnitude. The magnitude of this first signal is unavoidably also affected by the thickness of the member, since variations in the thickness vary the magnetic flux density within the area being inspected, and therefore vary the magnitude of leakage flux. The thickness of the member is measured simultaneously to derive a second signal representative of thickness in the area being inspected. This second signal is utilized to compensate for the effect of thickness in the first signal. In this manner, the effect of thickness variations can be eliminated.

The apparatus for determining the discontinuity magnitude may take a variety of different forms so that the apparatus is best adapted in accordance with the type of anticipated flaw, the shape, and composition of the member being inspected. The apparatus includes a magnetic structure designed to induce magnetic flux in the member being inspected so that the lines of force are perpendicular to the anticipated flaws. A suitable magnetic pickup device is located near the surface of the member to detect leakage flux and provide a corresponding signal representative of the flaw magnitude. The thickness measuring apparatus is positioned with respect to the pickup coil to simultaneously measure the thickness of that portion of the member being inspected by the pickup coil. The thickness measuring apparatus provides a second signal, this second signal being proportional to the member's thickness. The thickness measuring apparatus may, for example, be of one of the types more specifically described hereinafter, namely, of the pulse echo ultrasonic type, the radiation type, or the magnetic type.

The first signal, representative of flaw magnitude, can be modified to eliminate the effect of thickness variations by passing this signal through a variable gain amplifier. The gain of the amplifier is controlled by the second signal representative of the member thickness. Thus, the gain of the amplifier would be increased to increase the magnitude of the first signal when the thickness increases, reducing the flux density and leakage flux. In installations where it is merely necessary to have an indication when the flaw magnitude exceeds a predetermined value, the flaw signal can be compared to a reference signal in an electronic voltage comparator circuit. In the latter type of circuit arrangement, the magnitude of the reference signal can be modified in accordance with the thickness measurement to thus compensate for the effect of thickness variations.

The manner in which the stated, as well as other, objects of the invention are achieved is more fully described in the following specification and drawings, the drawings forming a part of the specification and wherein.

It should be stated at the outset that the invention is applicable to discontinuity evaluation systems generally. That is, the invention is applicable in any system, electromagnetic or otherwise, where a signal is derived which is a function of the discontinuity magnitude and unavoidably also a function of the thickness of the member being inspected. The unavoidable effect of thickness can then be eliminated by utilizing an independent thickness measurement to provide a signal which can be used to effect compensation.

Although the invention has general application, it is described specifically with respect to flaw evaluation of radial cracks along the seam of welded tubing in order to provide a clear illustration of the invention in one of its most advantageous embodiments. Ordinarily, welded tubing is manufactured in accordance with specifications where the tubing is unacceptable if cracks occur having more than a certain area (length x radial depth). The most critical portion of the tubing is the longitudinal segment including the welded seam. Unfortunately, it is difficult to accurately evaluate flaws in this segment because of the welding flash, usually on the inaccessible interior of the tubing, which causes variations in the wall thickness. An attempt is usually made to trim the interior flash, but a portion of the untrimmed flash often remains, resulting in wall thickness variations.

One convenient way of obtaining a signal which is a function of the flaw magnitude is to induce a circumferential magnetic field in the tubing and then to measure the leakage flux at the exterior surface of the tube. Cracks, or portions of cracks, in the interior untrimmed flash portion have little effect upon the leakage flux, which is a desirable effect, since it is not necessary to consider cracks in the excess wall thickness when determining defective tubing. However, the untrimmed flash acts as a magnetic shunt, which decreases the flux density in the area being inspected, in turn causing a decrease in leakage flux caused by the flaw. Thus, the leakage flux at the surface of the tubing is a function of the flaw magnitude and is unavoidably also a function of wall thickness.

Figure 1:
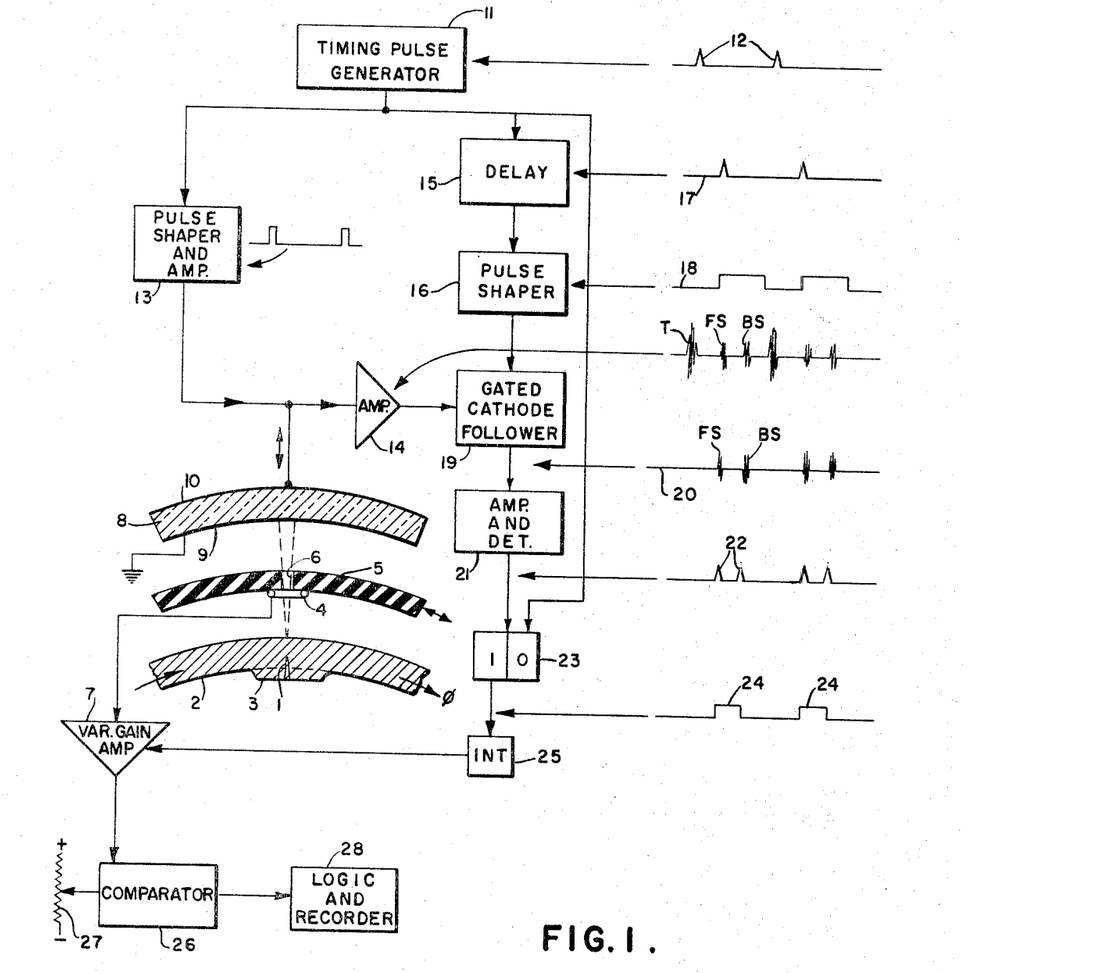
FIG. 1 is a schematic diagram illustrating apparatus in accordance with one embodiment of the invention.

One flaw evaluation system in accordance with this invention, which automatically compensates for the effect of thickness variations, is illustrated schematically in FIG. 1. The purpose of the apparatus is to evaluate a flaw 1 in the form of a radially extending crack in the welded seam portion of a tubular pipe 2 being inspected. A portion of tube wall is of increased thickness due to the untrimmed flash portion 3 of the tube. The pipe may be of any magnetic material in which magnetic lines of force $\phi$ can be induced. The lines of force are in the direction as indicated by the arrows in FIG. 1, i.e., concentric within the pipe and perpendicular to the anticipated flaw 1. Any reduction in the cross-sectional area of the tube wall, such as the reduction in cross-sectional area caused by flaw 1, causes an increased quantity of leakage flux at the exterior surface of the pipe radially adjacent the flaw.

A pickup coil 4 is mounted on a shielding member 5 having a curvature corresponding to the exterior curvature of the pipe. An aperture 6 extends vertically through the shielding member and through the center of pickup coil 4. Although the pickup coil is shown spaced from the tubular member, in actual practice the pickup coil would be as close to the exterior surface of the tubular member as is possible, and therefore the pickup coil lies in a plane tangential to the exterior surface of the tubular member. The pickup coil and shielding member are adapted for reciprocating movement, and therefore the pickup coil will respond to changes of leakage flux along the exterior surface to provide a first signal at the input of a variable gain amplifier 7.

Shielding member 5 is preferably constructed from a plastic ultrasonic energy absorbing material, and is disposed between the tubular member and an ultrasonic transducer. The ultrasonic transducer includes a quartz piezoelectric crystal 8 having curved surfaces 9 and 10 coated with a suitable conductive material. The space between the piezoelectric crystal and the tubular member is filled with a suitable coupling medium such as water. When a pulse of electrical energy is applied between coated surfaces 9 and 10, the piezoelectric crystal vibrates and generates a corresponding pulse of ultrasonic energy which is beamed toward the tubular member through aperture 6. A portion of the ultrasonic energy is reflected off the exterior surface of the tubular member, for convenience referred to as the front surface, and another portion of the ultrasonic energy passes through the tube wall and is reflected off the inner surface of the tubular member, which for convenience is referred to as the back surface. The reflected ultrasonic energy returns to the piezoelectric crystal 8 through aperture 6 and induces vibration in the crystal, in turn causing the crystal to generate electrical energy between the coated surfaces 9 and 10.

A timing pulse generator 11 provides a series of spaced pulses 12 and is connected to the input of a pulse shaper and amplifier circuit 13. The output of the pulse shaper and amplifier circuit is connected to coated surface 10, the other coated surface 9 of the piezoelectric crystal being connected to ground. Thus, the pulses from the pulse generator are amplified and shaped, and then utilized to energize the piezoelectric crystal to provide, in turn, the ultrasonic pulses which are transmitted toward the pipe being inspected. The spacing between successive pulses 12 is sufficient to permit dissipation of ultrasonic energy from a previous pulse.

Coated surface 10 is also connected to the input of an amplifier circuit 14 which amplifies the transmited pulse T as well as the subsequent FS and BS pulses generated by the piezoelectric crystal in response to ultrasonic energy reflected off the front surface and back surface, respectively, of the pipe being inspected. The time interval between the FS and BS pulses is a function of the round-trip travel time required for ultrasonic energy to pass through the wall of the tubular pipe, and therefore this time interval is proportional to the wall thickness. The output of timing pulse generator 11 is also connected to the input of a pulse shaper circuit 16 via a delay circuit 15, the output of the pulse shaper circuit in turn being connected to the gate input of a gated cathode follower circuit 19. The output of amplifier 14 is connected to the input of the gated cathode follower circuit. As is illustrated by wave forms 17 and 18, the delay and pulse shaper circuits are so designed that a signal is applied to the gate input of cathode follower circuit 19 which permits only the FS and BS pulses from amplifier 14 to pass through, and which blocks the T pulses. Accordingly, as shown by wave form 20, only the FS and BS pulses appear at the output of gated cathode follower circuit 19.

The output of gated cathode folower circuit 19 is connected to the symmetrical input of a flip-flop circuit 23 via an amplifier and detector circuit 21. The amplifier and detector circuit is operative to remove the high frequency components in the FS and BS pulses and provides corresponding pulses 22. Flip-flop circuit 23 is of conventional design, having a stable SET and RESET state, also referred to as the "1" and "0" states, respectively. The flip-flop circuit changes to the opposite state whenever a pulse is applied to the symmetrical input. The output of timing pulse generator 11 is connected to a RESET input of a flip-flop circuit to insure that the flip-flop circuit is in the RESET state subsequent to each transmitted ultrasonic pulse. When the ultrasonic energy reflected from the front surface is detected, a first pulse is applied to the symmetrical input of flip-flop circuit 23, placing the flip-flop circuit in the SET state. Subsequently, when ultrasonic energy reflected from the back surface is detected, a second pulse is applied to the symmetrical input, returning the flip-flop circuit to the RESET state. The flip-flop circuit provides an output signal level of a predetermined magnitude at the SET output while the flip-flop circuit is in the SET state. Accordingly, the pulses 24 appearing at the output of the flip-flop circuit have a predetermined magnitude, but have a pulse width directly proportional to the time interval between the FS and BS pulses, and hence this pulse width is proportional to the wall thickness.

The SET output of flip-flop circuit 23 is connected to an integrator circuit 25 which is of conventional design and is operative to integrate the pulses 24 to provide a D.C. signal having a magnitude representative of the wall thickness. The output of the integrator circuit is connected to control the gain of variable gain amplifier 7.

The gain of variable gain amplifier 7 is controlled so that the gain of the amplifier increases as the wall thickness increases. If, for example, a flaw is detected where the wall thickness is greater than normal, the induced flux density in the area being inspected is decreased, thereby reducing the magnitude of the leakage flux and the magnitude of the flaw signal generated by pickup coil 14. However, the increased wall thickness increases the gain of amplifier 7 to thereby increase the magnitude of the pulse which emerges from the amplifier, thus compensating for the effect of wall thickness upon the flaw signal. On the other hand, if a flaw is detected where the wall thickness is less than normal, the induced flux density, leakage flux and flaw signal are all increased in magnitude. Under these circumstances, the amplifier gain is automatically decreased to compensate for the effect of the decreased wall thickness upon the flaw signal.

The output of amplifier 7 is connected to one input of a voltage comparator circuit 26, the other input of the comparator circuit being derived from a voltage divider network 27. The voltage comparator circuit is of conventional design and is operative to provide an output signal when the signal from the variable gain amplifier exceeds the magnitude of the signal from voltage divider network 27. Accordingly, the voltage divider network 27 is adjusted to provide a signal corresponding to a predetermined flaw magnitude so that an output signal from the comparator circuit indicates that the flaw magnitude is greater than the predetermined value. The output of the comparator circuit is connected to a logic and recorder unit 28 which provides a suitable visible indication regarding the magnitude of detected flaws.

It should be noted that pickup coil 4, shielding member 5, and piezoelectric crystal 8 are not drawn to scale. In an actual unit, the pickup coil would be much smaller than shown, and would also be positioned as close to the external surface of tubular pipe 2 as possible. The piezoelectric crystal 8 would probably be somewhat smaller and also positioned much closer to the tubular member. The size of the coil and the size of the aperture would be selected in accordance with the inspection characteristics desired and would undoubtedly be smaller to confine the pipe inspection to a much smaller area. Shielding member 5 would be reciprocated so that the inspection scans back and forth across a selected segment of the pipe while the pipe is moved along its longitudinal axis.

Figures 2, 4, 5, 6:
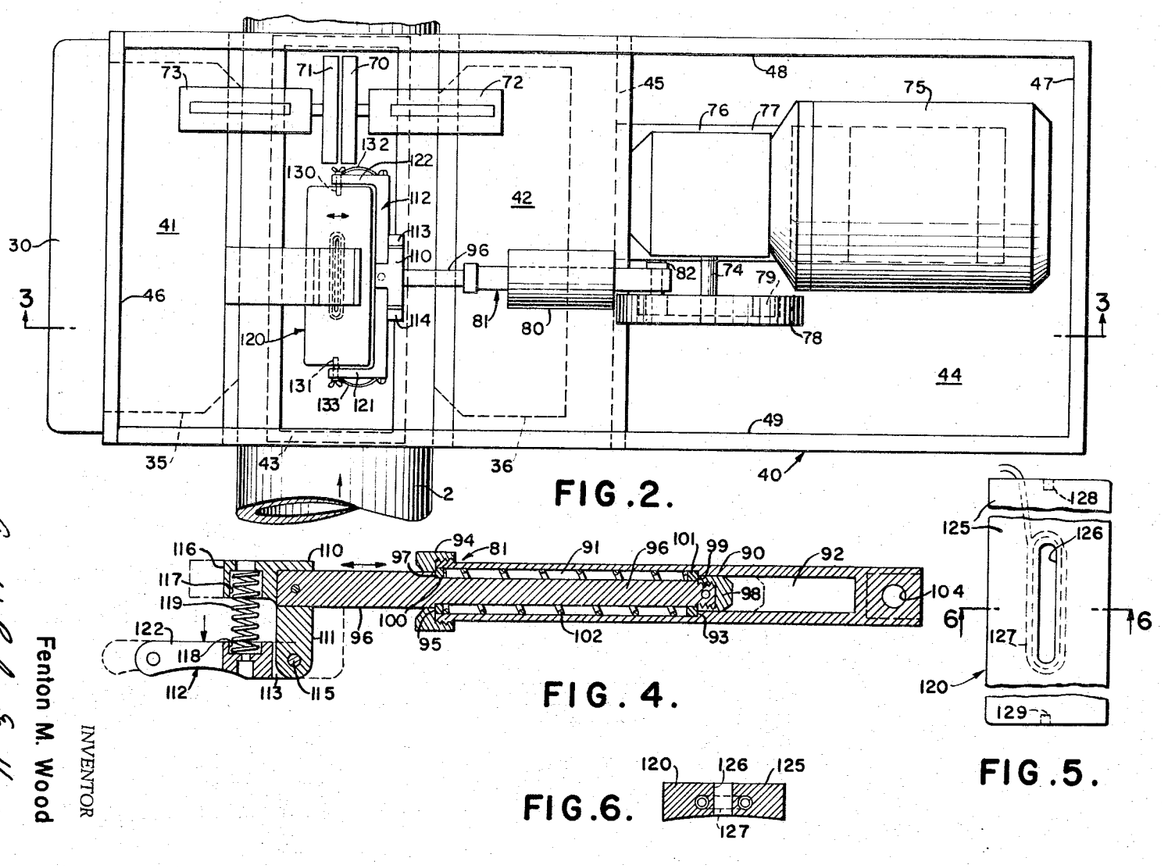
FIG. 2 is a plan view, with the top cover removed, of apparatus for housing portions of the system shown in FIG. 1.
FIG. 4 is a cross-sectional view illustrating the detail construction of a cam follower linkage appearing in FIGS. 2 and 3.
FIGS. 5 and 6 are plan and cross-sectional views, respectively, of the pickup shoe appearing in FIGS. 2 and 3.
Figure 3:
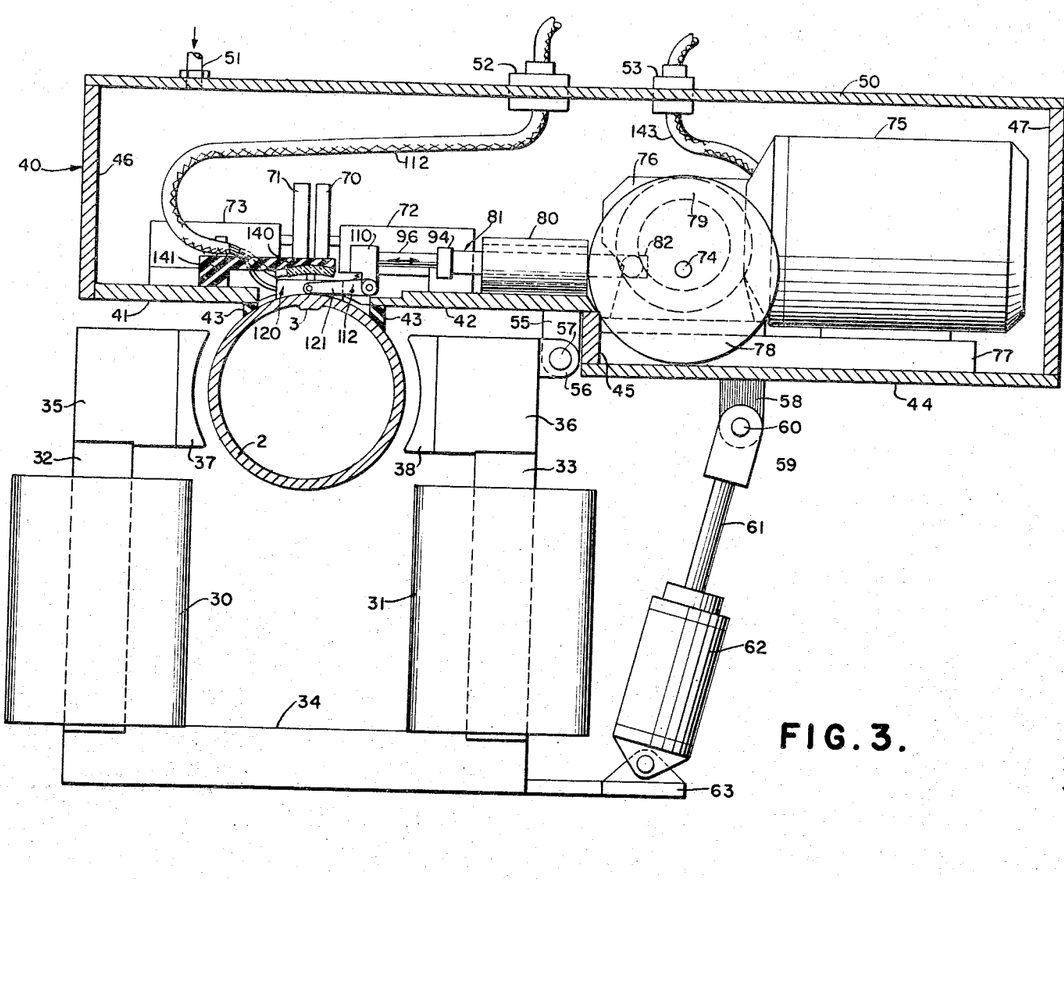
FIG. 3 is a cross-sectioned view taken along line 3—3 in FIG. 2.

Suitable apparatus for housing the piezoelectric crystal and the pickup coil is shown in detail in FIGS. 2–6. The magnetic structure for inducing magnetic flux in tubular member 2 is best seen in FIG. 3, and includes a pair of electromagnetic coils 30 and 31 energized from a suitable DC source (not shown). A pair of vertical armature members 32 and 33 extend through the center of coils 30 and 31, respectively, and are joined at one end by a horizontal cross armature member 34. A pole piece 35 is secured to the free end of vertical armature member 32, and a similar pole piece 36 is secured to the free end of vertical armature member 33. Pole pieces 35 and 36 are positioned on diametrically opposite sides of pipe 2 and include the pole faces 37 and 38, respectively, which are adjacent the tubular member and are provided with curved surfaces generally conforming to the exterior curvature of the pipe being inspected. The pole pieces and armature members are preferably constructed from relatively soft laminated iron to provide a low reluctance magnetic path. The electromagnetic coils 30 and 31 are connected in a series aiding relationship.

When the electromagnetic coils are energized, the lines of force cross the air gap from one of the pole faces, into pipe 2 and travel circumferentially through the pipe to the opposite side, and then cross the air gap into the other pole face. Thus, circumferential lines of force are established crossing the longitudinal section of the pipe being inspected, which, as shown, is the segment including the untrimmed flash 3.

The pickup coil, piezoelectrical crystal, and shielding member, as well as the apparatus for reciprocating the shielding member, are housed within a tank structure 40. The tank structure includes a pair of bottom walls 41 and 42 disposed in the same horizontal plane (as viewed in FIG. 3) but separated somewhat to provide an opening for free access to the segment of the pipe being inspected from within the tank. A rubber sealing gasket 43 surrounds the opening between bottom walls 41 and 42. The tank structure further includes a lower offset bottom wall 44 secured to bottom wall 42 by means of a vertical spacer 45. A pair of end walls 46 and 47, as well as a pair of side walls 48 and 49 are secured to the edges of the bottom walls. The tank structure is completed by a cover plate 50 secured to the end and side walls. Cover plate 50 is provided with a liquid inlet 50, as well as connectors 52 and 53 through which electrical conductors communicate with the apparatus within the tank. The various walls are secured to one another in watertight relationship to thus provide a tank structure 40 which is watertight except for the opening between bottom walls 41 and 42.

A downwardly extending member 55 is secured to the lower surface of bottom wall 42 and is journaled in a bifurcated member 56 extending horizontally from the pole piece 36. A journal pin 57 extends through apertures in members 55 and 5 6to complete a pivot connection between the tank and pole piece 36. A downwardly extending member 58 is secured to the lower surface of bottom wall 44. Member 57 is journaled in a bifurcated end portion 59, by means of a journal pin 60, bifurcated end portion in turn being secured to the free end of a pusher rod 61 of an electromagnetic solenoid structure 62. The solenoid structure is pivotally secured to a member 63 extending from cross armature member 34.

When the solenoid is energized, the pusher rod is withdrawn, causing tank structure 40 to be pivoted away from pipe 2. In this position, the pipe can easily be removed, and a new pipe inserted. While being inspected, the pipe 2 rests on suitable rollers (not shown) including drive rollers for causing the pipe to move along its longitudinal axis. A pair of rollers 70 and 71 are disposed within the tank and are journaled in suitable bearings 72 and 73, respectively. These bearings are secured to bottom walls 42 and 41. When the solenoid 62 is deenergized, pusher rod 61 returns to the extended position, as shown in FIG. 3, permitting the tank structure to pivot toward pipe 2 until rollers 70 and 71 come to rest against the exterior surface of the pipe. Rollers 70 and 71 appropriately position the tank with respect to the pipe, regardless of the pipe diameter.

The apparatus for providing the reciprocating movement includes an electric motor 75, with a speed reduction gear drive unit 76 mounted at one end. Motor 75 and the gear drive unit 76 are secured to bottom wall 44 by means of suitable support blocks 77.

A circular cam member 78 is secured to the free end of shaft 74 emerging from gear drive unit 76. Cam member 78 is machined to define an internal eccentric cam track 79. A cam follower linkage 81 is slidably journaled in a bearing member 80 which is secured to bottom wall 42. A cam follower pin 82 is secured to one end of linkage 81 and is adapted to ride in cam track 79. Therefore, as cam member 78 rotates, linkage 81 reciprocates.

The cam follower linkage is shown in greater detail in the cross-sectional view of FIG. 4. The linkage includes a tubular body 90 having a smooth external surface so that the body can be slidably journaled in bearing 80. The body is machined from one end to form a large diameter recess 91 followed by a smaller diameter recess 92 to thereby define an annular shoulder 93 at the interface between the recesses. An annular cap 94 is secured to the end of body 90 from which the recesses extend by means of external threads on the body. An aperture, of approximately the same diameter as recess 92, extends longitudinally through the center of annular cap 94, thereby defining an annular shoulder 95 when the cap is secured in position. A rod 96 has a diameter such that the rod may slide within the aperture in annular cap 94. The rod has a reduced diameter portion and an end cap 98 secured to the free end of the reduced diameter portion by means of suitable threads. End cap 98 defines an annular shoulder 99, and the beginning of the reduced diameter portion of rod 96 defines an annular shoulder 97. The distance between shoulders 97 and 99 is the same as the distance between shoulders 93 and 95.

A washer 100 of the proper diameter is inserted to rest against shoulder 95 and 97 with the reduced diameter portion of rod 96 passing through the washer. A similar size washer 101 is inserted to rest against shoulders 93 and 99 with rod 96 passing through the washer. A compression spring 102 is disposed between the washers, forcing the washers against the respective shoulders.

The cam follower linkage provides a structure sufficiently rigid to transmit the reciprocating movement, and also provides a structure which is yieldable when the longitudinal force in either direction exceeds a predetermined magnitude. For example, if sufficient force is applied to rod 96, forcing the rod toward the right as viewed in FIG. 4, the bias of spring 102 is overcome and therefore rod 96 and washer 97 move toward the right, compressing the spring against washer 101, which is maintained in position by shoulder 93. On the other hand, if sufficient force is applied, pulling rod 96 toward the left as viewed in FIG. 4, rod 96 and washer 101 move toward the left, compressing spring 102 against washer 100 which is maintained in position by shoulder 95. If the force applied to rod 96 is not sufficient to overcome the spring bias, the linkage can be considered rigid.

Aperture 104 is provided near one end of body 90 and is dimensioned to accommodate the cam follower pin 82.

An L-shaped member 110 is rigidly secured to the end of rod 96 opposite end cap 98. The downwardly extending portion 111 of member 110 (as viewed in FIG. 4) is rounded at the free end and has a horizontal aperture extending through the member at the center of the rounded end portion. A shoe yoke 112 includes a pair of tabs 113 and 114, separated to accommodate the downwardly extended portion 111 between the tabs. A journal pin 115 passes through the aperture in member 110 and through suitable apertures in tabs 113 and 114 to pivotably secure the shoe yoke to L-shaped member 110. The horizontally extending portion 116 of the L-shaped member is provided with an annular recess 117 extending from the lower surface thereof, and shoe yoke 112 is provided with a corresponding recess 118 extending from the upper surface, so that a compression spring 119 may be inserted between the recesses. A search shoe 120 is accommodated between legs 121 and 122 of shoe yoke 112 and therefore when the apparatus is positioned as shown in FIG. 3, the search shoe is urged downwardly against the external surface of pipe 2 by means of spring 119.

Search shoe 120 is shown in greater detail in FIGS. 5 and 6, and includes a rectangular block 125 of a suitable ultrasonic energy absorbing material such as Bakelite. A centrally located slot 126 extends through block 125 from top to bottom (as viewed in FIG. 6). The lower surface of block 125 has a slight curvature corresponding to the external curvature of pipe 2. A pickup coil 127, which consists of a few turns of wire forming a flat loop, is embedded in block 125 so that the pickup coil surrounds slot 126 and lies in a plane parallel to the upper and lower surfaces of the block. It should be noted that search shoe 120, including block 125, slot 126 and pickup coil 127, is the equivalent of shield member 5, aperture 6 and pickup coil 4, shown in FIG. 1. It is desirable that the pickup coil be embedded in block 125 to avoid unnecessary wear on the coil as it moves along the surface of the pipe being inspected.

A pair of recesses 128 and 129 extend inwardly along the longitudinal center of block 125, these holes being adapted to accommodate pins 130 and 131, respectively (FIG. 2). Search shoe 120 is dimensioned to fit within the area between legs 121 and 122 of the shoe yoke. Pins 130 and 131 are attached to the ends of leaf springs 132 and 133, respectively, and pass through suitable apertures at the ends of legs 121 and 122 to rest in recesses 128 and 129 to thereby pivotally retain search shoe 120 in position. Leaf springs 132 and 133 are secured to the outer surfaces of legs 121 and 122, respectively.

A curved piezoelectric crystal 140 is mounted on a suitable support unit 141, preferably constructed of Bakelite or the like. The support block is secured to bottom wall 41. Crystal 140 is the equivalent of crystal 8 in FIG. 1 and has electric conductors connected to the coated curved surfaces. These conductors, as well as the leads from pickup coil 127, are embodied in a cable 144 passing through connector 52. Energizing current from motor 75 is carried by suitable conductors in a cable 143 passing through connector 53.

The inspection apparatus is placed in operation by first placing a pipe to be inspected in the appropriate position, as indicated in FIGS. 2 and 3. The tank structure is then pivoted to the position indicated in FIG. 3 with rollers 70 and 71 resting against the external surface of pipe 2. The tank is then filled with a suitable ultrasonic coupling medium, such as water preferably mixed with a suitable wetting agent to reduce the possibility of air bubbles within the tank. It is anticipated that some of the coupling liquid will escape from the tank and therefore it is desirable to have the liquid maintained under a slight pressure, so that the escaping liquid is always replaced.

Motor 75 is then energized to rotate cam member 78, thereby causing search shoe 120 to reciprocate between the opposing edges of bottom walls 41 and 42, i.e., perpendicular to the longitudinal axis of pipe 2. The pipe is then moved along its longitudinal axis by means of a suitable drive mechanism (not shown), so that the search shoe will scan a longitudinal segment of the pipe.

Electromagnetic coils 30 and 31 are energized to induce the circumferential magnetic field in the segment of the pipe being inspected. As previously mentioned, any radial flaws existing in the segment being inspected will cause corresponding increases in the leakage flux at the surface of the pipe. Pickup coil 127 in search shoe 120 will detect the changes in leakage flux and thereby provide an output signal which is a function of the flaw magnitude, and unavoidably also a function of the wall thickness. Piezoelectric crystal 140 is periodically energized to provide ultrasonic pulses. The crystal is responsive to reflected energy from the front and back surfaces of the pipe wall so that a signal can be derived proportional to the wall thickness. The thickness measuring apparatus thereby provides an indication of the wall thickness of that portion of the wall visible through slot 126 in the search shoe. It is anticipated that the area to be inspected will vary in accordance with the dimensions and composition of the pipes being inspected. For this reason, search shoe 120 is made easily replaceable. By appropriate selection of slot size and pickup coil dimensions, for example, the inspection apparatus can easily be adapted for any particular pipe.

Figure 7:
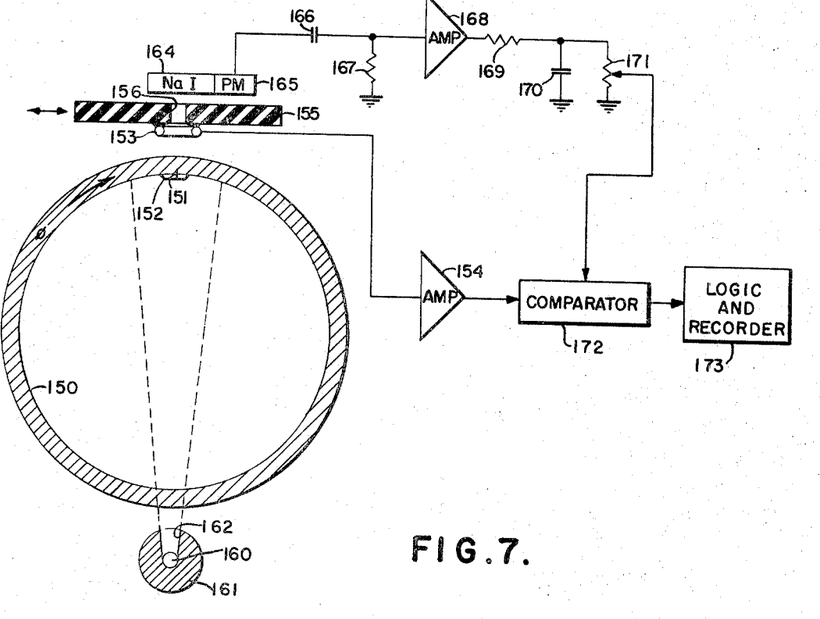
FIG. 7 is a schematic diagram illustrating apparatus in accordance with a second embodiment of the invention.

Another embodiment of the invention, utilizing radiation type thickness measuring apparatus, is illustrated schematically in FIG. 7. The purpose of the apparatus is to derive an indication in accordance with the magnitude of flaws, such as a radial crack 151, in the wall of a tubular pipe 150. The inspection apparatus scans a longitudinal segment of the pipe, which can be the longitudinal section shown in FIG. 7, which includes the longitudinal welded seam and the untrimmed flash 152. A suitable magnetic structure (not shown) similar to that shown in FIGS. 2 and 3 is utilized to induce a circumferential magnetic flux φ across the segment of the pipe being inspected.

A flat pickup coil 153 is mounted on the lower surface (as viewed in FIG. 7) of a shielding member 155 so that the coil surrounds an aperture 156 passing through the shielding member from top to bottom. Shielding member 155 is constructed from a material which is generally opaque to a gamma ray radiation. The shielding member is adapted for reciprocating movement and can be housed in physical apparatus similar to that previously described in FIGS. 2 and 3. Accordingly, pickup coil 153 moves along the exterior surface of pipe 150 and is therefore responsive to changes in leakage flux caused by flaws. The pickup coil provides a signal at the input of amplifier 154, which is a function of the detected flaw magnitude and also unavoidably a function of wall thickness.

A radio isotope 160 is housed in a suitable enclosure 161 having an aperture or slot 162 which permits a beam of gamma ray radiation to be projected against the segment of the tubular pipe being inspected. A relatively large sodium iodide crystal is positioned so that a portion of the radiated gamma ray energy will pass through aperture 156 and strike the sodium iodide crystal. Crystal 164 is sufficiently large to receive the energy passing through aperture 156, regardless of the position of the shielding member 155. The quantity of radiation energy which strikes crystal 164 is a function of the wall thickness of that portion of the pipe wall in direct alignment between radiation source 160 and aperture 156.

A photomultiplier tube 165 is coupled to one end of crystal 164 and is so connected that it provides an electrical signal corresponding to the light flashes produced by crystal 164. The photomultiplier tube is connected to the input of an amplifier 168 via a series connected capacitor 166, which blocks the D.C. output bias from the photomultiplier tube, and a parallel resistor across which the electrical pulses are developed. The output of amplifier 168 is connected to a resistor 171 via an integrator circuit including a series resistor 169 and a parallel capacitor 170 connected to ground. Thus, the signal appearing across resistor 171 is a relatively smooth D.C. signal. The quantity of radiation energy received by crystal 164 decreases as the wall thickness increases and therefore the magnitude of the signal appearing across resistor 171 is inversely related to wall thickness.

A portion of the signal appearing across resistor 171 is tapped off and applied to one input of a voltage comparator circuit 172, the output of amplifier 154 being connected to the other input of the voltage comparator circuit. The voltage comparator circuit is designed to provide an output indication to a logic and recorded circuit 173 when the magnitude of the signal from amplifier 154 exceeds that derived from resistor 171. The logic and recorder circuit 173 provides visual indication and record indicating defective pipe when a signal is received from voltage comparator circuit 172.

Assume for the moment that the wall thickness is uniform, and that therefore the signal across resistor 171 remains relatively constant as the inspected segment of the pipe is scanned. The adjustable tap on resistor 171 can be positioned to provide a selected reference signal at one input of the voltage comparator circuit 172, in accordance with the maximum permissible flaw magnitude. If a flaw is present in the segment of the tube wall being inspected and has a magnitude in excess of the maximum limit, pickup coil 153 will detect the corresponding change in leakage flux when traversing the surface of the tube and will thus provide a signal via amplifier 154 which exceeds the reference signal level. Therefore, the output signal from the voltage comparator circuit 172 under these circumstances indicates defective pipe.

As the wall thickness increases, the magnetic flux density in the tube wall decreases and therefore pickup coil 153 will provide a signal via amplifier 154 which has a lesser magnitude for the same size flaw. However, the increases in wall thickness also decrease the magnitude of the reference signal derived from resistor 171 and therefore the voltage comparator circuit 172 still provides the same indication of defective pipe when the flaw magnitude exceeds the permissible limit.

It should be pointed out, with regard to FIG. 7, that pickup coil 153, shielding member 155 and sodium iodide crystal 164 are not drawn to scale. In actual practice, each of these components would probably be substantially smaller to confine the inspection over a much smaller area. Also, pickup coil 153 would be positioned as close as possible to the exterior surface of tubular pipe 150. It should also be noted that the signal from resistor 171, which is representative of wall thickness, can be utilized to vary the gain of amplifier 154 instead of varying the reference signal input to the voltage comparator circuit. In other words, the effect of thickness upon the signal from the pickup coil can be compensated for by varying the gain of the amplifier connected to the pickup coil, such as, for example, as is done in the FIG. 1 embodiment, or can be utilized to vary the reference signal input to the voltage comparator circuit, such as is accomplished in FIG. 7.

Figure 8:
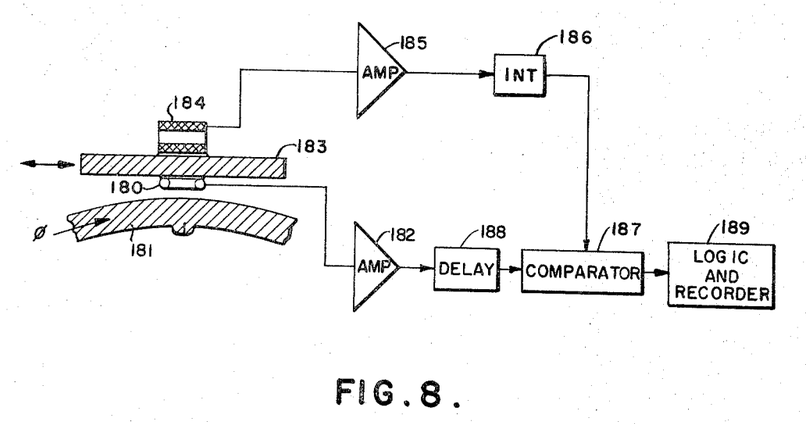
FIG. 8 is a schematic diagram illustrating apparatus in accordance with still another embodiment of the invention.

Another embodiment of the invention is illustrated schematically in FIG. 8, wherein a magnetic coil is used to accomplish the thickness measurement.

The apparatus in FIG. 8 includes a pickup coil 180 essentially the same as that previously described in FIGS. 1 and 7. Pickup coil 180 provides an output signal which is a function of the magnitude of flaws detected in a wall of tubular pipe member 181, and which is also a function of the wall thickness. Pickup coil 180 is mounted on a reciprocating plate 183 which is constructed of nonmagnetic material. Also mounted on reciprocating plate 183 is a second magnetic coil 184. The axis of coil 184 is perpendicular to the axis of pickup coil 180. The axes of both coils are perpendicular to the longitudinal axis of pipe 181 being inspected. As reciprocating member 183 causes coil 184 to traverse the surface of pipe 181, coil 184 provides a signal related to a wall thickness. This signal is amplified by means of an amplifier 185 and then integrated by an integration circuit 186 to provide a reference voltage signal at one input to a voltage comparator circuit 187. This reference signal is inversely proportional to wall thickness and therefore is operative in the same manner as the signal derived from resistor 171 in FIG. 7. Integrator circuit 186 provides a small time delay and therefore a time delay circuit 188 is inserted between the output of amplifier 182 and the other input of voltage comparator circuit 187. The voltage comparator circuit provides an output signal to the logic and recording apparatus 189 whenever the signal from pickup coil 180 exceeds that coming from integration circuit 186. In this manner, the apparatus always provides an indication when the flaw magnitude exceeds the permissible limit.

It is pointed out with respect to the FIG. 8 that coils 180 and 184 are shown much larger than actual size in comparison to pipe 181. In actual practice, these coils would be smaller to confine the inspected area to a much smaller zone.

While only certain advantageous embodiments of the invention have been described in detail, it should be obvious to one skilled in the art that the invention has numerous applications other than those specifically shown. In any type of flaw evaluation apparatus where a signal proportional to flaw magnitude is also unavoidably proportional to wall thickness, the effect of wall thickness can be compensated for by means of a thickness measuring device interconnected in accordance with this invention. The invention is more particularly defined in the appended claims.

What is claimed is:

1. In apparatus responsive to the true magnitude of discontinuities in metallic members being inspected, the combination of
   means for inducing magnetic flux in the member being inspected;
   a magnetic pickup device operative
       to detect leakage flux caused by discontinuities in said member, and
       to provide a first signal which is a function of the magnitude of said detected leakage flux;
   means for simultaneously measuring the thickness of that portion of said member being inspected by said magnetic pickup device to provide a second signal, said second signal being a function of said thickness; and
   circuit means responsive to said first and second signals to provide an indication in accordance with the true discontinuity magnitude,
       said circuit means being operative to utilize said second signal representative of thickness to compensate said first signal for the effect of thickness variations to thereby provide said indication of the true discontinuity magnitude.

2. Apparatus in accordance with claim 1 wherein said circuit means comprises
   a variable gain amplifier operatively connected to amplify said first signal, the gain of said amplifier being controlled by said second signal.

3. Apparatus in accordance with claim 1 wherein said circuit means comprises
   means responsive to said second signal to provide a reference signal having a magnitude related to said thickness, and
   electrical comparator circuit means for comparing the magnitude of said first signal with said reference signal.

4. In apparatus responsive to the true magnitude of discontinuities in members being inspected, the combination of
   means for establishing in said member fixed inspection conditions,
   first means for magnetically inspecting a selected portion of said member to provide a detected first signal which is a function of the magnitude of discontinuities in said portion being inspected, and which is unavoidably also a function of the thickness of said portion being inspected;
   second means for measuring the thickness of said portion being inspected by said first means to provide a second signal, said second signal being a function of said thickness; and
   circuit means responsive to said first and second signals to provide an indication in accordance with the true discontinuity magnitude,
       said circuit means being operative to utilize said second signal representative of thickness to compensate said first signal for the effect of thickness to thereby provide said indication in accordance with the true discontinuity magnitude.

5. Apparatus in accordance with claim 4 wherein said second means comprises
   pulse echo ultrasonic thickness measuring apparatus operative to provide said second signal as a function of the time required for a pulse of ultrasonic energy to pass through said portion of the member being inspected.

6. Apparatus in accordance with claim 4 wherein said second means comprises
   a source of radiation energy, and
   means responsive to a portion of the energy from said source after passing through said member and operative to provide said second signal as a function of the quantity of radiation energy passing through said portion of the member being inspected.

7. Apparatus in accordance with claim 4 wherein said second means comprises
   means for inducing magnetic flux in said member, and
   a magnetic means so oriented with respect to the lines of said magnetic flux that said magnetic means is operable to provide said second signal as a function of the thickness of said member.

8. In apparatus responsive to the true magnitude of discontinuities in metallic members being inspected, the combination of
   means for inducing magnetic flux in the member being inspected;
   a pickup coil oriented to detect leakage flux at the surface of said member caused by discontinuities within said member;
   means for causing relative motion between said coil and said member so that said coil will respond to changes in said leakage flux to generate a first signal which is a function of the magnitude of detected discontinuities;
   means for simultaneously measuring the thickness of that portion of said member being inspected by said pickup coil to provide a second signal, said second signal being a function of said thickness;
   circuit means responsive to said first and second signals to provide an indication in accordance with the true discontinuity magnitude,
       said circuit means being operative to utilize said second signal representative of thickness to compensate said first signal for the effect of thickness variations to thereby provide said indication of the true discontinuity magnitude.

9. Apparatus in accordance with claim 8 wherein said metallic member is a seamed tubular member, and
   said pickup coil is reciprocated back and forth across the seam of said member as the member is moved along its longitudinal axis.

10. In apparatus responsive to the true magnitude of discontinuities in metallic members being inspected, the combination of
    means for inducing magnetic flux in the member being inspected;
    an energy absorbing shield having an aperture therein;
    a pickup coil surrounding said aperture and oriented to detect leakage flux at the surface of said member caused by discontinuities within said member;
    means for causing relative motion between said shield and said member being inspected so that said coil responds to changes in leakage flux to generate a first signal which is a function of the magnitude of detected discontinuities;
    ultrasonic transmitting and receiving means operative
       to transmit pulses of ultrasonic energy through said aperture into said member being inspected, and
       to detect ultrasonic energy reflected off the front and back surfaces of the member being inspected;
    first circuit means
       connected to said receiving means, and operable in response to the time interval between detection of ultrasonic energy reflected off said front surface and ultrasonic energy reflected off said back surface to provide a second signal, said second signal being a function of the thickness of that portion of the member simultaneously being inspected by said pickup coil;

second circuit means responsive to said first and second signals to provide an indication in accordance with the true discontinuity magnitude, said circuit means being operative to utilize said second signal representative of thickness to compensate for the effect of thickness in said first signal representative of detected leakage flux to thereby provide said indication in accordance with the true discontinuity magnitude.

11. Apparatus in accordance with claim 10 arranged to detect longitudinal flaws in a tubular metallic member wherein said means for inducing magnetic flux comprises a magnetic structure arranged to induce a circumferential magnetic flux in said tubular member, and said means for causing relative motion is operable to reciprocate said shield at right angles to longitudinal axis of said tubular member.

12. Apparatus in accordance with claim 10 wherein said ultrasonic transmitting and receiving means comprises a crystal coupled to said member by a fluid coupling medium.

pulse generating means connected to periodically excite said crystal to provide corresponding pulses of ultrasonic energy, said crystal also being operable to provide electrical pulses in response to ultrasonic energy reflected off said front and back surface of said member, and wherein said first circuit means is connected to said crystal and is responsive only to said electrical pulses provided by said crystal in response to reflected ultrasonic energy to derive said second signal having a magnitude proportional to the time interval between successive electrical pulses from said crystal.

13. In apparatus for inspecting a longitudinal segment of a tubular member for discontinuities, the combination of a pickup shoe adapted for reciprocating movement on the exterior surface of the tubular member transversely of the longitudinal segment being inspected; said pickup shoe including first means for inspecting a portion of said segment adjacent said pickup shoe to provide a signal which is a function of the magnitude of discontinuities within said portion being inspected and unavoidably also a function of the thickness of said portion being inspected, and second means for measuring the thickness of said portion being inspected; and circuit means connected to said first and second means and operative to compensate for the effect of thickness upon said signal to thereby provide an indication in accordance with the true magnitude of discontinuities within said portion being inspected.

14. Apparatus in accordance with claim 13 further comprising apparatus for reciprocating said pickup shoe including a rotating cam member, and a longitudinal cam follower linkage operably interconnected between said cam member and said pickup shoe, said linkage being sufficiently rigid to normally provide said reciprocating movement but also being spring biased to change its longitudinal dimension when the free movement of said pickup shoe is impeded in either direction during said reciprocating movement.

15. In apparatus responsive to the true magnitude of discontinuities in metallic members being inspected, the combination of means for inducing magnetic flux in the member being inspected;

an energy absorbing shield having an aperture therein;

a pickup coil surrounding said aperture and oriented to detect leakage flux at the surface of said member caused by discontinuities within said member;

means for causing relative motion between said shield and said member being inspected so that said coil responds to changes in leakage flux to generate a first signal which is a function of the magnitude of detected discontinuities;

a source of radiation;

radiation measuring means disposed to measure the quantity of radiation from said source passing through said member and said aperture, said radiation measuring means being operable to provide a second signal as a function of said quantity to thereby represent the thickness of that portion of the member simultaneously being inspected by said pickup coil; and circuit means responsive to said first and second signals to provide an indication in accordance with the true discontinuity magnitude, said circuit means being operative to utilize said second signal representative of thickness to compensate for the effect of thickness in said first signal representative of detected leakage flux to thereby provide said indication in accordance with the true discontinuity magnitude.

16. Apparatus in accordance with claim 15 arranged to detect longitudinal flaws in a tubular metallic member wherein said means for inducing magnetic flux comprises a magnetic structure arranged to induce a circumferential magnetic flux in said tubular member, and said means for causing relative motion is operable to reciprocate said shield at right angles to the longitudinal axis of said tubular member.

17. In apparatus responsive to the true magnitude of discontinuities in metallic members being inspected, the combination of means for inducing magnetic flux in the member being inspected;

a pickup coil oriented to detect leakage flux at the surface of said member caused by discontinuities within said member, said pickup coil being operative to provide a first signal representative of discontinuity magnitudes;

a second coil disposed relative to said pickup coil to provide a second signal related to the thickness of that portion of the member being inspected by said pickup coil;

means for causing relative motion between said coils and the member being inspected; and circuit means responsive to said first and second signals to provide an indication in accordance with the true discontinuity magnitude, said circuit means being operative to utilize said second signal related to thickness to compensate said first signal for the effect of thickness to thereby provide said indication in accordance with the true discontinuity magnitude.

18. The method of accurately measuring the magnitude of a discontinuity in a metallic member comprising:

inducing magnetic flux in the member;

measuring the leakage flux at the surface of the member to derive an indication of the magnitude of discontinuities in the member, said indication unavoidably also being affected by the thickness of the member;

separately measuring the thickness of that portion of the member being inspected; and utilizing said thickness measurement to compensate for the effect of thickness in said indication to thereby achieve an indication in accordance with the true magnitude of discontinuities within the member.

19. In apparatus responsive to the true magnitude of discontinuities in a metallic tubular member being inspected, the combination of means for inducing magnetic flux in the tubular member being inspected;

a pickup coil oriented to detect leakage flux at the surface of said tubular member caused by discontinuities within said tubular member, said pickup coil being operative to provide a first signal representative of discontinuity magnitudes;

a second coil disposed relative to said pickup coil to provide a second signal related to the thickness of that portion of the tubular member being inspected by said pickup coil, the axis of said pickup coil being perpendicular to the axis of said second coil and the axes of said coils being each perpendicular to the longitudinal axis of the tubular member being inspected;

means for causing relative motion between said coils and the tubular member being inspected; and circuit means responsive to said first and second signals to provide an indication in accordance with the true discontinuity magnitude, said circuit means being operative to utilize said second signal related to thickness to compensate for the effect of thickness in said first signal representative of discontinuity magnitudes to thereby provide said indication in accordance with the true discontinuity magnitude.

References Cited

UNITED STATES PATENTS

| | | | |
|---|---|---|---|
| 2,011,425 | 8/1935 | Sperry et al. | 324—37 |
| 2,264,725 | 12/1941 | Shoupp et al. | 324—34 |
| 2,951,984 | 9/1960 | Zoltan | 324—34 |
| 3,209,243 | 9/1965 | Walters et al. | 324—34 |
| 3,281,667 | 10/1966 | Dobbins et al. | 324—40 |

FOREIGN PATENTS 597,671   5/1934   Germany.

OTHER REFERENCES

McMasters, R. C.: Non-Destructive Testing Handbook, Ronald Press, New York, 1963, copyrighted 1959, TA 410 M32 C2, vol. II, pp. 43.28–43.31.

McMasters, R. C.: Non-Destructive Testing Handbook, New York, The Ronald Press Company, 1963, pp. 36.6–36.7.

Siemens et al.: German application No. 1,120,591, publ. December 1961, 324–34 (1 sht. dwg.; 2 sht. spec.).

RUDOLPH V. ROLINEC, *Primary Examiner.*

RICHARD B. WILKINSON, WALTER L. CARLSON, *Examiners.*

R. J. CORCORAN, *Assistant Examiner.*

UNITED STATES PATENT OFFICE
CERTIFICATE OF CORRECTION

Patent No. 3,345,563                                          October 3, 1967

Fenton M. Wood

It is hereby certified that error appears in the above numbered patent requiring correction and that the said Letters Patent should read as corrected below.

Column 1, line 23, for "acomplished" read -- accomplished --; column 4, line 22, after "of" insert -- equally --; line 35, for "transmited" read -- transmitted --; line 58, for "folower" read -- follower --; column 6, line 44, for "5 6 to" read -- 56 to --; line 47, for "57" read -- 58 --; column 10, line 58, after "to" strike out "a"; column 11, line 6, for "skiled" read -- skilled --; line 12, for "tin" read -- in --; column 13, line 10, after "said" insert -- second --; line 24, after "to" insert -- the --.

Signed and sealed this 29th day of October 1968.

(SEAL)
Attest:

Edward M. Fletcher, Jr.                                       EDWARD J. BRENNER
Attesting Officer                                                   Commissioner of Patents